(No Model.)

T. W. LARRABEE.
DRAIN PIPE.

No. 373,077. Patented Nov. 15, 1887.

Witnesses:
John Enders, Jr.

Inventor:
Thomas W. Larrabee,
By Attorneys.

UNITED STATES PATENT OFFICE.

THOMAS W. LARRABEE, OF CARROLLTON, INDIANA.

DRAIN-PIPE.

SPECIFICATION forming part of Letters Patent No. 373,077, dated November 15, 1887.

Application filed January 13, 1887. Serial No. 224,229. (No model.)

*To all whom it may concern:*

Be it known that I, THOMAS W. LARRABEE, a citizen of the United States of America, residing at Carrollton, in the county of Hancock and State of Indiana, have invented certain new and useful Improvements in Drain-Pipes, of which the following is a specification, reference being had therein to the accompanying drawings.

This invention pertains to certain new and useful improvements in drain-pipes; and it consists in the detailed construction, combination, and arrangement of the parts, substantially as hereinafter fully set forth, and particularly pointed out in the claims.

Figure 1:
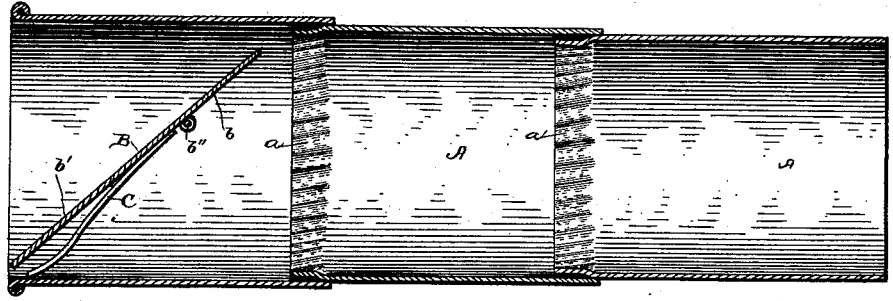
Figure 2:
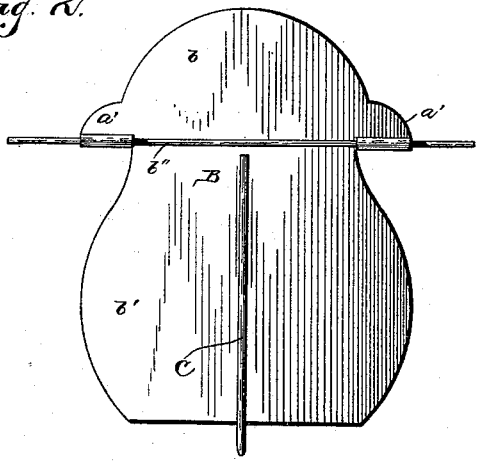
Figure 3:
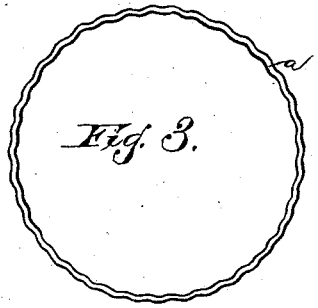

In the accompanying drawings, Figure 1 is a longitudinal sectional elevation of my invention, and Figs. 2 and 3 are detail views thereof.

For the purpose of securely jointing or securing the telescoping ends of the sections of the preferably zinc drain-pipe, I corrugate or flute one end, $a$, of a section, A, in the direction in which the same is screwed or turned in effecting the joint or connection. This corrugated or fluted end of each section-pipe is placed or inserted a short distance within the end of the adjoining section-pipe, as will be seen by reference to Fig. 1. By thus joining or uniting the sections of my drain-pipe all possible leakage or escape of the water from the drain-pipe is provided against, thus preventing the undermining of the ground or washing away of the soil. The outer exposed end of the section-pipe is wired and curved or rounded, so as to strengthen the same as against bending or other damage consequent upon the exposure thereof.

Another object of my invention is that of the adaptation of means for preventing animals—such as musk-rats, moles, &c.—from entering the drain-pipe; to also provide for the circulation of air in said pipe, the ingress or entrance of which can be regulated as may be desired.

To accomplish these objects I employ a valve, B, preferably of the formation shown, the same consisting of a plate having an upper short arm, $b$, and lower longer arm, $b'$. This valve is journaled or pivoted by a rod or heavy wire, $b''$, passed crosswise the end tile-pipe, and is inclasped by flanged or turned pieces $a'$ cut from each side of the valve. To the under side of the lower longer arm, $b'$, at a point adjacent the pivotal bar $b''$, is rigidly secured one end of a flexible rod or wire finger, C, the other end of which projects a short distance beyond or on a line with the lower forward horizontal end of the valve, as shown in Fig. 1. By means of this flexible finger the valve can, by bending said finger, be caused to occupy any desired position, whereby the ingress of air is permitted as may be desired. The side edges of the flanged pieces $a'$ bear against the inner sides of the drain-pipe, so as to hold the valve securely in place, and prevents any lateral movement thereof. The upper short arm, $b$, of the valve serves as a counterpoise for the lower longer arm thereof; hence it will not require as much water-force to raise the valve as would otherwise be necessary.

From what has been said it will be seen that by bending the flexible finger of the valve the upper end of said valve can be raised or lowered according to the amount of air it is desired to maintain in the drain-pipe, which is a desideratum in this class of inventions.

Having thus fully described my invention, what I claim, and desire to secure by Letters Patent, is—

1. The herein-described drain-pipe, consisting of the sections having telescoping ends, the pivoted valve having a long and short arm and the flexible finger, all arranged substantially as shown and described.

2. The combination, with the drain-pipe, of the valve and the flexible finger, substantially as shown and described.

In testimony whereof I affix my signature in presence of two witnesses.

THOMAS W. LARRABEE.

Witnesses.
JEROME MATILLO,
LAWRENCE BORING.